United States Patent
Kuo

(10) Patent No.: US 8,184,178 B2
(45) Date of Patent: May 22, 2012

(54) METHOD AND ELECTRONIC DEVICE FOR ADJUSTING COMPRESSION RATIO OF JPEG IMAGE

(75) Inventor: Chun-Ming Kuo, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 455 days.

(21) Appl. No.: 12/579,537

(22) Filed: Oct. 15, 2009

(65) Prior Publication Data
US 2010/0103285 A1    Apr. 29, 2010

(30) Foreign Application Priority Data
Oct. 29, 2008    (TW) ............................... 97141695 A

(51) Int. Cl.
*H04N 5/76*    (2006.01)

(52) U.S. Cl. ................. 348/231.99; 382/232; 348/222.1

(58) Field of Classification Search ............. 348/231.99, 348/231.6, 222.1
See application file for complete search history.

(56) References Cited

U.S. PATENT DOCUMENTS
2007/0177809 A1* 8/2007 Takahashi ...................... 382/232
2008/0285866 A1* 11/2008 Ishikawa ....................... 382/232
* cited by examiner

*Primary Examiner* — Gevell Selby
(74) *Attorney, Agent, or Firm* — Rabin & Berdo, P.C.

(57) ABSTRACT

A method and an electronic device for adjusting a compression ratio of a JPEG image are used to adjust a size of a JPEG image file. The method includes the following steps. a raw image, a first compression parameter (SF1) and a second compression parameter (SF2) are obtained. Then, the first compression parameter and the second compression parameter is used to compress the raw image respectively to obtain a first file and a second file of the compressed raw image A target file size (Target) is set. The target file size, the size of the first file (FileSize1), and the size of the second file (FileSize2) are used to calculate a target compression parameter (NSF) that is generated according to the equation, $$\log(NSF) = \frac{\log\left(\frac{SF1}{SF2}\right)}{\log\left(\frac{FileSize1}{FileSize2}\right)} \times \log\left(\frac{Target}{FileSize1}\right) + \log(SF1).$$

Then, the target compression parameter is loaded to compress the raw image, so as to output a target image.

9 Claims, 5 Drawing Sheets

| G | B | G | B | G |
|---|---|---|---|---|
| R | G | R | G | R |
| G | B | G | B | G |
| R | G | R | G | R |
| G | B | G | B | G |

METHOD AND ELECTRONIC DEVICE FOR ADJUSTING COMPRESSION RATIO OF JPEG IMAGE

CROSS-REFERENCE TO RELATED APPLICATIONS

This non-provisional application claims priority under 35 U.S.C. §119(a) on Patent Application Nos. 097141695 filed in Taiwan, R.O.C. on Oct. 29, 2008, the entire contents of which are hereby incorporated by reference.

BACKGROUND OF THE INVENTION

1. Field of the Invention

The present invention relates to a method and an electronic device for processing a digital image, and more particularly to a method and an electronic device for adjusting a compression ratio of a JPEG image.

2. Related Art

With the popularization of digital camera devices, more and more people have joined the photography activities. Generally, an ordinary digital camera device adopts an image format of Joint Photographic Experts Group (briefly referred to as JPEG hereinafter). The compression manner for the JPEG format falls within the scope of lossy compression, that is to say, a visible damage occurs to the quality of images during compression.

FIG. 1 is a schematic diagram of a conventional JPEG compression process. Referring to FIG. 1, a conventional JPEG compression process includes the following steps. A captured digital image is processed through a color space conversion (Step S110), so that the digital image is converted from a red-green-blue (RGB) color space into a different color space referred to as YCrCr, in which Y is a luminance signal, and CbCr is a chroma signal. Next, a discrete cosine transform (DCT) is performed (Step S120). Pixel blocks in a form of 8*8 pixel arrays without overlying are obtained one by one from the converted digital images. Then, a two dimensional discrete cosine transform (2D-DCT) is performed to convert each pixel block into a frequency space. Then, the quantization is executed (Step S130), and the pixel block that has already been converted through the 2D-DCT is divided by a quantization table (Step S140). Then, an entropy coding is executed (Step S150), so as to calculate an entropy value of the pixel block processed in Step S140 and to perform a length coding on the processed pixel block.

In order to adjust a file size of a digital image, a compression parameter is generally used to make a further processing on the quantization table. The larger the compression parameter is, the smaller file size the raw image is compressed into, and vice versa. But if the file size is rather small (that is, the compression ratio is quite large), several details of the digital image are sacrificed.

SUMMARY OF THE INVENTION

In view of the above problems, the present invention is mainly directed to providing a method for adjusting a compression ratio of a JPEG image, which is applicable to generate a compression parameter consistent with a JPEG image file.

In order to achieve the above objective, the present invention provides a method for adjusting a compression ratio of a JPEG image, which includes the following steps: obtaining a raw image, a first compression parameter (SF1) and a second compression parameter (SF2); using the first compression parameter and the second compression parameter to compress the raw image respectively to obtain a first file and a second file of the compressed raw image; setting a target file size (Target); using the target file size, the size of the first file (FileSize1), and the size of the second file (FileSize2) to calculate a target compression parameter (NSF) that is generated according to the following equation:

$$\log(NSF) = \frac{\log\left(\frac{SF1}{SF2}\right)}{\log\left(\frac{FileSize1}{FileSize2}\right)} \times \log\left(\frac{Target}{FileSize1}\right) + \log(SF1); \text{ and}$$

loading the target compression parameter to compress the raw image, so as to output a target image.

In another aspect, the present invention is directed to an electronic device for adjusting a compression ratio of a JPEG image, which is applicable to generate a compression parameter consistent with a JPEG image file.

In order to achieve the above objective, the present invention provides an electronic device for adjusting a compression ratio of a JPEG image, which includes a storage unit, a compression unit, a computing unit and a processing unit. A compression parameter lookup table includes compression parameters adopted for obtaining a first compression parameter and a second compression parameter. The compression unit uses the first compression parameter and the second compression parameter recited in the compression parameter lookup table to compress the raw image respectively to obtain a first file and a second file of the compressed raw image. The computing unit calculates a target compression parameter according to the target file size, the size of the first file and the size of the second file. The processing unit is electrically coupled to the compression parameter lookup table, the compression unit and the computing unit. After the processing unit fetches the raw image, the processing unit uses the compressing unit for fetching the first file and the second file and then loads the target compression parameter to the compression unit for compressing the raw image to a target image matching the target file size.

The present invention provides a method for adjusting a compression ratio of a JPEG image, which is applicable to find out a suitable compression ratio for each JPEG image.

BRIEF DESCRIPTION OF THE DRAWINGS

The present invention will become more fully understood from the detailed description given herein below for illustration only, and thus is not limitative of the present invention, and wherein:

FIG. 4 is a schematic diagram of a Bayer pattern; and

DETAILED DESCRIPTION OF THE INVENTION

Figure 1:
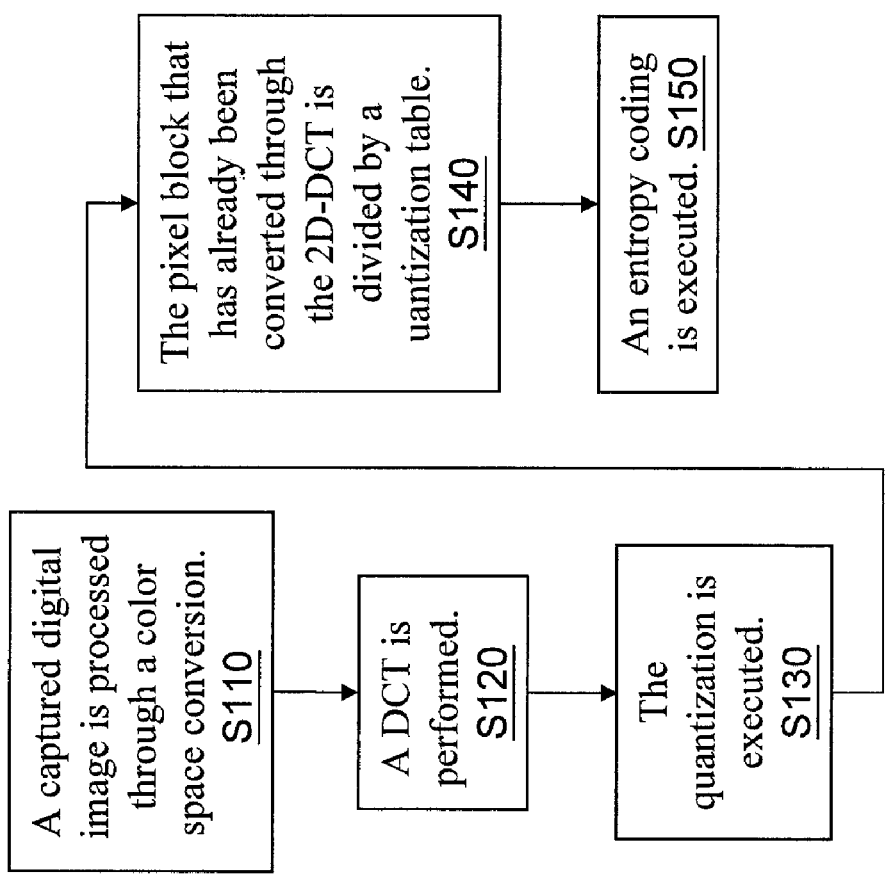
FIG. 1 is a schematic diagram of a conventional JPEG compression process.
Figure 2:
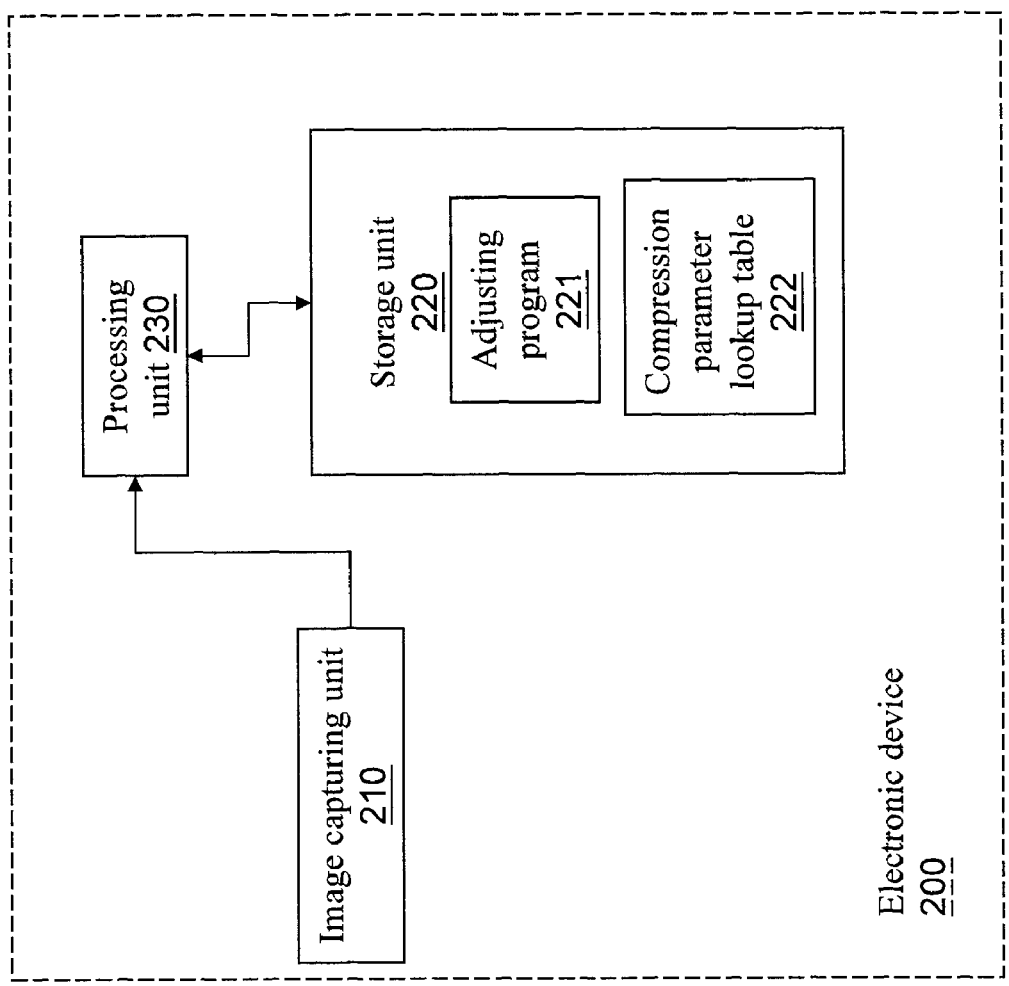
FIG. 2 is a schematic diagram of an architecture of the present invention.

FIG. 2 is a schematic diagram of an architecture of the present invention. Referring to FIG. 2, an electronic device of the present invention can be applied to a web camera, a digital camera, a digital video, or another computer device with an image capturing function. The electronic device 200 includes: an image capturing unit 210, a compression unit 215, a storage unit 220, a computing unit 221, a compression parameter lookup table 222, and a processing unit 230.

The image capturing unit 210 electrically coupled to the processing unit is used to capture a raw image. The image capturing unit 210 is a charge-coupled device (CCD) or a complementary metal-oxide-semiconductor (CMOS). The storage unit 220 is electrically coupled to the processing unit 230 and stores the raw image and a target image. The storage unit 220 is a hard disk drive, a flash memory, or a read-only memory.

The compression parameter lookup table 222 includes multiple compression parameters which include a first compression parameter and a second compression parameter. Specifically, in one embodiment according to this invention, the compression parameter lookup table 222 is a memory storing the compression parameters. The compression unit 215 uses the first compression parameter and the second compression parameter to compress the raw image respectively to obtain a first file and a second file of the compressed raw image.

Figure 3:
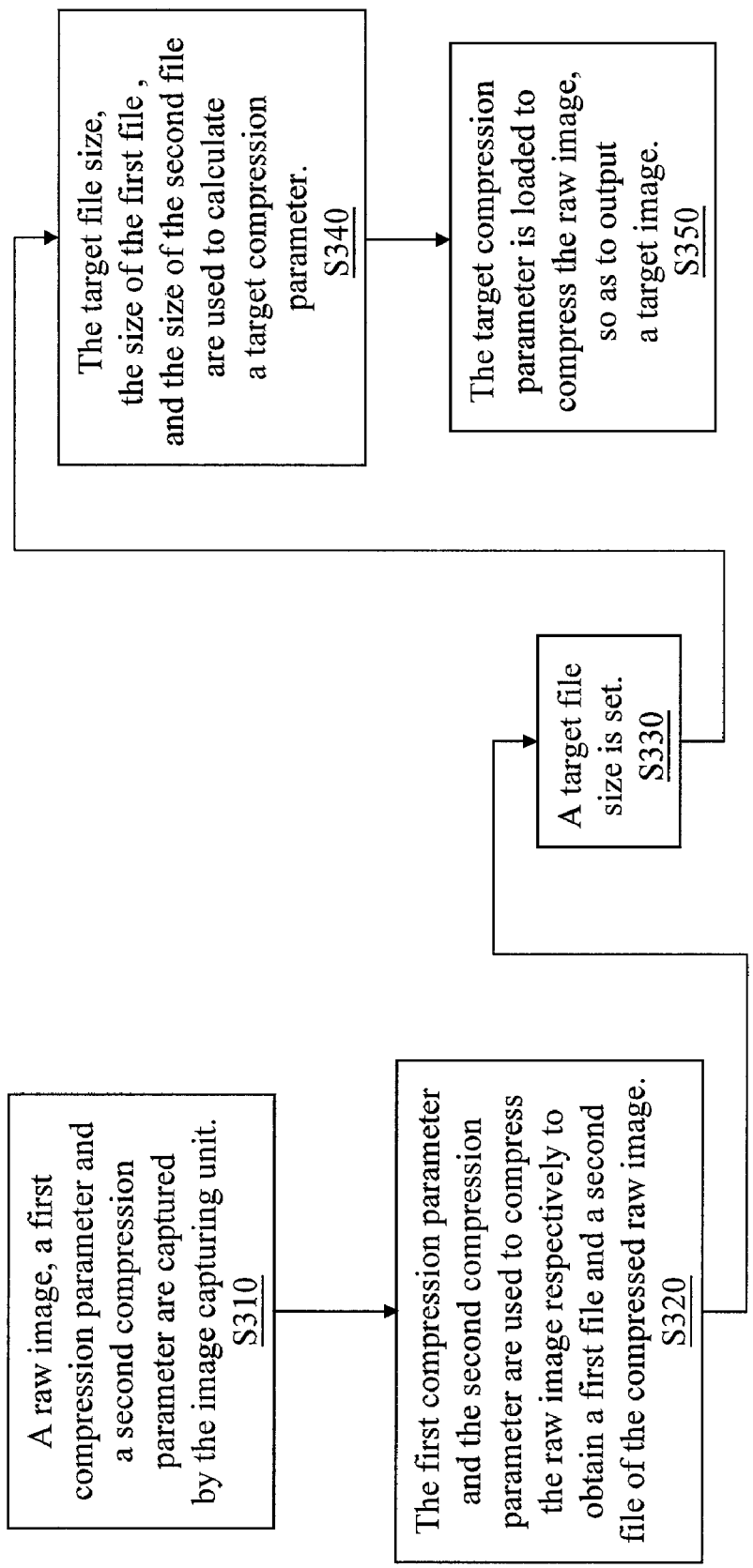
FIG. 3 is a schematic diagram of an operation flow of the present invention.

The computing unit 221 calculates a target compression parameter according to the target file size, the size of the first file and the size of the second file, wherein the target file size, for example, is stored in the storage unit 220. The processing unit 230 is electrically connected to the compression parameter lookup table 222, the image capturing unit 210, the storage unit 220 and computing unit 221. The processing unit 230 fetches the raw image, uses the compressing unit for fetching the first file and the second file, and then loads the target compression parameter to the compression unit for compressing the raw image to a target image matching the target file size. Preferably, when fetching the raw image, the processing unit 230 further extracts a green pixel signal from the raw image. FIG. 3 is a schematic diagram of an operation flow of the present invention. The present invention performs the following steps. A raw image, a first compression parameter, and a second compression parameter are obtained (Step S310). The raw image is in a storage format of low-level digital image, which is a Bayer pattern with several pixels. Preferably, in the step of obtaining the raw image, a green pixel signal is extracted from the raw image.

Figure 4:
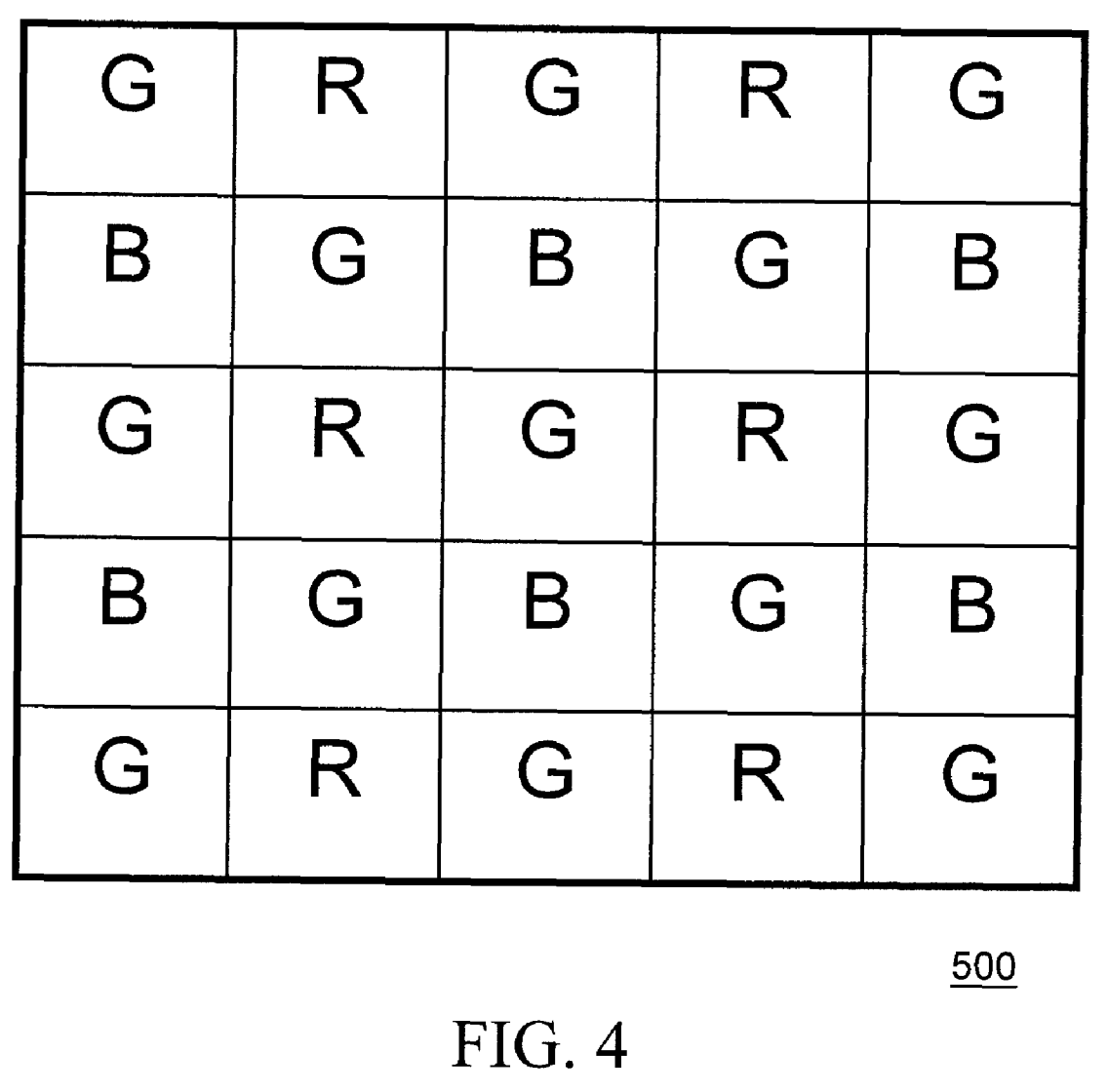

Furthermore, FIG. 4 is a schematic diagram of a Bayer pattern 500. Referring to FIG. 4, the Bayer pattern 500 utilizes a principle that the distinguishing sensitivity of human eyes to the intensity of green is stronger than that of red or blue. Thus, in the color filter array (CFA) of the Bayer pattern 500, the frequency for a green filter to appear in the array is twice as that of a blue filter or a red filter, such that every four pixels form one unit. The arrangement order of the filters is that the red filters and the green filters are alternately arranged, and in the next row, the green filters and the blue filters are alternately arranged. In the implementation aspect of the present invention, the Bayer pattern is formed by CFAs.

Figure 5:
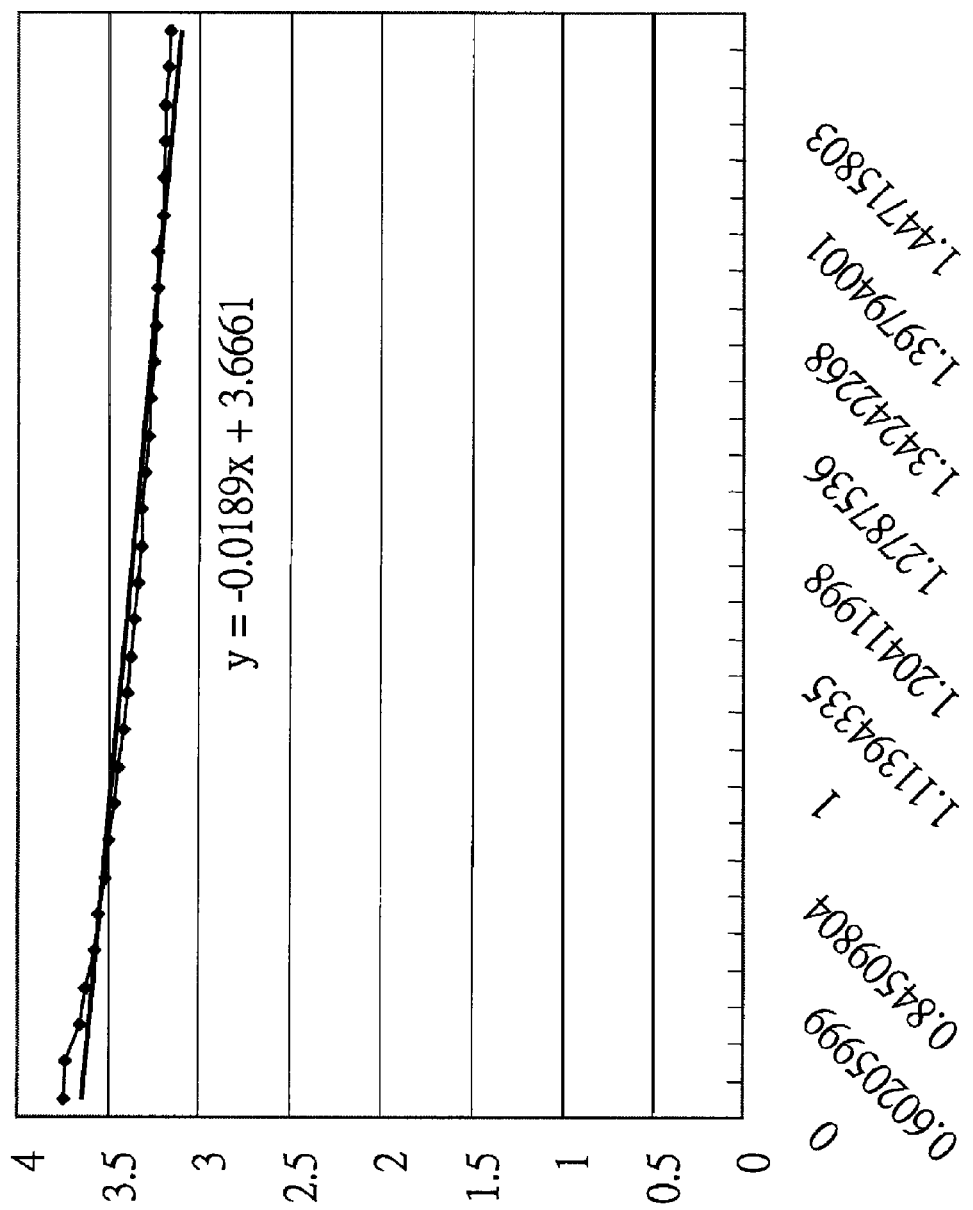
FIG. 5 is a schematic diagram of a graph generated by utilizing a first file size and a second file size.

Next, a first compression parameter and a second compression parameter are used by the compression unit 215 to compress the raw image respectively to obtain a first file and a second file of the compressed raw image (Step S320). Specifically, a compression parameter lookup table 222 recording compression parameters is provided, and then the first compression parameter and the second compression parameter are selected from the compression parameters. Next, the first compression parameter and the second compression parameter are used to compress the raw image respectively to obtain a first file and a second file of the compressed raw image. Furthermore, FIG. 5 is a schematic diagram of a graph generated by utilizing the first file size and the second file size.

Then, a target file size is set (Step S330). Then, the target file size (Target), the size of the first file (FileSize1), and the size of the second file (FileSize2) are used by the computing unit 221 to calculate a target compression parameter (NSF) (Step S340). The target compression parameter is calculated according to the following equation:

$$\log(NSF) = \frac{\log\left(\frac{SF1}{SF2}\right)}{\log\left(\frac{FileSize1}{FileSize2}\right)} \times \log\left(\frac{\text{Target}}{FileSize1}\right) + \log(SF1). \quad \text{Eq. 1}$$

Finally, the target compression parameter is loaded to the compression unit 215 by the processing unit 230 to compress the raw image, so as to output a target image (Step S350).

The present invention provides a method for adjusting a compression ratio of a JPEG image, so as to find out a suitable compression ratio for each JPEG image.

What is claimed is:

1. A method for adjusting a compression ratio of a Joint Photographic Experts Group (JPEG) image, applicable to generate a compression parameter consistent with a JPEG image file, comprising:

obtaining a raw image, a first compression parameter (SF1), and a second compression parameter (SF2);

using the first compression parameter and the second compression parameter to compress the raw image respectively to obtain a first file and a second file of the compressed raw image;

setting a target file size (Target);

using the target file size, the size of the first file (FileSize1), and the size of the second file (FileSize2) to calculate a target compression parameter (NSF) that is generated according to the following equation:

$$\log(NSF) = \frac{\log\left(\frac{SF1}{SF2}\right)}{\log\left(\frac{FileSize1}{FileSize2}\right)} \times \log\left(\frac{\text{Target}}{FileSize1}\right) + \log(SF1); \text{ and}$$

loading the target compression parameter to compress the raw image, so as to output a target image.

2. The method for adjusting a compression ratio of a JPEG image according to claim 1, wherein the step of obtaining the raw image comprises extracting a green pixel signal from the raw image.

3. An electronic device for adjusting a compression ratio of a JPEG image, applicable to find out a target file size of a raw image captured by the electronic device, comprising:

a compression parameter lookup table, including a plurality of compression parameter adopted for obtaining a first compression parameter and a second compression parameter; a compression unit, using the first compression parameter and the second compression parameter recited in the compression parameter lookup table to compress the raw image respectively to obtain a first file and a second file of the compressed raw image;

a computing unit, calculating a target compression parameter according to the target file size, the size of the first file and the size of the second file; and a processing unit, electrically coupled to the compression parameter lookup table, the compression unit and the computing unit, after the processing unit fetches the raw image, the processing unit using the compressing unit for fetching the first file and the second file and then loading the target compression parameter to the compression unit for compressing the raw image to a target image matching the target file size.

4. The electronic device for adjusting a compression ratio of a JPEG image according to claim 3, wherein when obtaining the raw image, the processing unit further extracts a green pixel signal from the raw image.

5. The electronic device for adjusting a compression ratio of a JPEG image according to claim 3, further comprising an image capturing unit electrically coupled to the processing unit and fetching the raw image.

6. The electronic device for adjusting a compression ratio of a JPEG image according to claim 5, wherein the image capturing unit is a charge-coupled device (CCD) or a complementary metal-oxide-semiconductor (CMOS).

7. The electronic device for adjusting a compression ratio of a JPEG image according to claim 3, further comprising a storage unit electrically coupled to the processing unit, wherein the storage unit stores the raw image and the target image.

8. The electronic device for adjusting a compression ratio of a JPEG image according to claim 7, wherein the storage unit is a hard disk drive, a flash memory, or a read-only memory.

9. The electronic device for adjusting a compression ratio of a JPEG image according to claim 3, wherein the target compression parameter is calculated according to the following equation:

$$\log(NSF) = \frac{\log\left(\frac{SF1}{SF2}\right)}{\log\left(\frac{FileSize1}{FileSize2}\right)} \times \log\left(\frac{Target}{FileSize1}\right) + \log(SF1)$$

where NSF is the target compression parameter;
SF 1 is the first compression parameter; SF 2 is the second compression parameter;
FileSize 1 is the size of the first file;
FileSize 2 is the size of the second file and
Target is the target file size.

* * * * *